(12) United States Patent
Zeng (10) Patent No.: US 12,141,602 B2
(45) Date of Patent: Nov. 12, 2024

(54) ASYNCHRONOUS QUANTUM INFORMATION PROCESSING

(71) Applicant: Goldman Sachs & Co. LLC, New York, NY (US)

(72) Inventor: William Joseph Zeng, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 699 days.

(21) Appl. No.: 17/234,700

(22) Filed: Apr. 19, 2021

(65) Prior Publication Data

US 2021/0334128 A1 Oct. 28, 2021

Related U.S. Application Data

(60) Provisional application No. 63/014,066, filed on Apr. 22, 2020.

(51) Int. Cl.
  *G06F 9/48* (2006.01)
  *G06N 7/01* (2023.01)
  *G06N 10/00* (2022.01)
  *G06N 20/00* (2019.01)

(52) U.S. Cl.
  CPC .............. *G06F 9/4843* (2013.01); *G06N 7/01* (2023.01); *G06N 10/00* (2019.01); *G06N 20/00* (2019.01)

(58) Field of Classification Search
  None
  See application file for complete search history.

(56) References Cited

U.S. PATENT DOCUMENTS

| 2007/0007008 A1* | 1/2007 | Sherrill | E21B 49/087 166/264 |
|---|---|---|---|
| 2008/0313430 A1 | 12/2008 | Bunyk | |
| 2020/0104740 A1 | 4/2020 | Cao | |

(Continued)

FOREIGN PATENT DOCUMENTS

KR  10-2006-0032777 A  4/2006

OTHER PUBLICATIONS

Bauer, B. et al., "Hybrid Quantum-Classical Approach to Correlated Materials," Physical Review X, Jul.-Sep. 2016, pp. 031045-1-031045-11, vol. 6, No. 3.

(Continued)

*Primary Examiner* — Wynuel S Aquino
(74) *Attorney, Agent, or Firm* — Fenwick & West LLP (57) ABSTRACT

An asynchronous approach to implementing a quantum algorithm can reduce dead time of a quantum information processing unit (QIPU). Multiple parameter sets are determined for a quantum program by a controller and the QIPU is instructed to execute the quantum program for the parameter sets. Results from each program execution are returned to the controller. After one or more results are received, the controller determines an updated parameter set while the QIPU continues executing the quantum program for the remaining parameter sets. The QIPU is instructed to execute the quantum program for the updated parameter set (e.g., immediately, after a current program execution, or after the remaining parameter sets are processed). This asynchronous approach can result in the QIPU having little or no dead time, and thus can make more efficient use of the QIPU.

18 Claims, 10 Drawing Sheets

(56) References Cited

U.S. PATENT DOCUMENTS

2020/0326977 A1* 10/2020 Gambetta ............. G06F 9/5044
2021/0012233 A1* 1/2021 Gambetta ................ G06F 8/44

OTHER PUBLICATIONS

Beals, R. et al., "Efficient distributed quantum computing," Proceedings of the Royal Society A: Mathematical, Physical and Engineering Sciences, 2013, 20 pages, vol. 469, No. 2153.

Bergholm, V. et al., "PennyLane: Automatic differentiation of hybrid quantum-classical computations," arXiv preprint arXiv: 1811.04968, Nov. 12, 2018, 12 pages.

Degen, C. L. et al., "Quantum sensing," Reviews of Modern Physics, Jul.-Sep. 2017, pp. 035002-1-035002-39, vol. 89, No. 3.

Devitt, S. J. et al., "Quantum Error Correction for Beginners," arXiv preprint arXiv: 0905.2794v4, Jun. 21, 2013, 41 pages.

Konečný, J et al., "Federated Optimization: Distributed Machine Learning for on-Device Intelligence," arXiv preprint arXiv: 1610.02527, Oct. 8, 2016, 38 pages.

Otterbach, J.S. et al., "Unsupervised Machine Learning on a Hybrid Quantum Computer," arXiv preprint arXiv: 1712.05771, Dec. 15, 2017, 17 pages.

Peruzzo, A. et al., "A variational eigenvalue solver on a photonic quantum processor," Nature Communications, Jul. 23, 2014, seven pages, vol. 5, No. 4213.

Smith, R. S. et al., "A Practical Quantum Instruction Set Architecture," arXiv preprint arXiv: 1608.03355, Aug. 11, 2016, 14 pages.

Xie, C. et al., "Asynchronous Federated Optimization," arXiv preprint arXiv: 1903.03934, Mar. 10, 2019, 10 pages.

U.S. Appl. No. 16/546,088, filed Aug. 20, 2019, Inventor Peter L. McMahon (copy not enclosed).

Ablayev, F. et al. "Model of a Programmable Quantum Processing Device." ResearchGate, Quantum Cryptography, Dec. 2016, pp. 1-15.

Bertels, L. et al. "Quantum Computer Architecture: Towards Full-Stack Quantum Accelerators." Cornell University, Quantum Physics, Sep. 2019, pp. 1-20.

PCT International Search Report and Written Opinion, PCT Application No. PCT/IB2021/053222, Jul. 23, 2021, 12 pages.

Ryan, C. A. et al. "Hardware for Dynamic Quantum Computing." Cornell University, arXiv.org > quant-ph > arXiv:1704.08314, Apr. 2017, pp. 1-13.

European Patent Office, Extended European Search Report and Opinion, EP Patent Application No. EP 21792950.4, Feb. 21, 2024, 13 pages.

* cited by examiner

ASYNCHRONOUS QUANTUM INFORMATION PROCESSING

CROSS-REFERENCE TO RELATED APPLICATION

This application claims priority under 35 U.S.C. § 119(e) to U.S. Provisional Patent Application Ser. No. 63/014,066, titled "Asynchronous Quantum Information Processing," and filed on Apr. 22, 2020, which is hereby incorporated by reference in its entirety.

BACKGROUND

1. Technical Field

The subject matter described generally relates to quantum computing and, in particular, an asynchronous approach for quantum information processing.

2. Background Information

A quantum algorithm can include many quantum circuits linked together by classical computations. Consequently, modern quantum information processing can involve communication between quantum processors and other compute units, e.g. CPUs, GPUs, FPGAs, or other digital or analog processors. A full quantum algorithm can perform hybrid execution between the quantum processor and a classical compute. Example hybrid algorithms include (i) variational quantum algorithms (such as the variational quantum eigensolver, the quantum approximation algorithm, or a variety of quantum machine learning methods) (ii) quantum error correction (iii) federate quantum learning, and other uses.

SUMMARY

A serial method for implementing a quantum algorithm may include a controller computing a first parameter set for a quantum program and a quantum information processing unit (QIPU) executing the quantum program using the first parameter set (examples of a QIPU include a quantum processing unit (QPU), a quantum sensor, a network of QPUs, or a network of quantum sensors). The controller receives the results of the execution and determines an updated parameter set based on the results. The QIPU is instructed to execute the quantum program with the updated parameter set. This process may be repeated until an end condition is met (e.g., a solution converges). The QIPU may remain idle while updated parameter sets are determined.

Embodiments relate to an asynchronous method of implementing the quantum algorithm where dead time of the QIPU is reduced or eliminated. Multiple parameter sets are determined for the quantum program, and the QIPU is instructed to execute the quantum program for each parameter set. Individual results or aggregated results (e.g., an expectation value) from each program execution may be returned to the controller. After one or more results are received, the controller determines an updated parameter set while the QIPU continues executing the quantum program for the remaining parameter sets. The QIPU is then instructed to execute the quantum program for the updated parameter set (e.g., immediately, after a current program execution, or after the remaining parameter sets are processed). This asynchronous method results in the QIPU having little or no dead time, and thus results in more efficient use of the QIPU. Furthermore, by determining updated parameters as results are received from the QIPU and by adjusting a queue of the QIPU in real time, the asynchronous method is more flexible and dynamic than the serial method, which may result in the end condition being met sooner. Furthermore, the asynchronous method may provide more results than the serial method, which, since QIPUs are inherently probabilistic, may lead to higher confidence results and solutions.

In one embodiment, a quantum processing system includes one or more (e.g., classical) controllers and a QIPU. The one or more controllers calculate a series of initial parameters sets for a quantum program. The quantum program with the series of initial parameter sets is dispatched to a quantum processing queue. The QIPU evaluates a first expectation value for the quantum program with parameters of a first initial parameter set and broadcasts the first expectation value to the one or more controllers. While the QIPU evaluates a second expectation value for the quantum program with parameters of a second initial parameter set, the one or more controllers compute a next parameter set based on the first initial parameter set and the first expectation value. The next parameter set is dispatched to the quantum processing queue and the QIPU evaluates a next expectation value for the quantum program with parameters of the next parameter set.

DETAILED DESCRIPTION

Reference will now be made to several embodiments, examples of which are illustrated in the accompanying figures. Wherever practicable, similar or like reference numbers are used in the figures to indicate similar or like functionality. Although various specific embodiments are described, one of skill in the art will recognize that the alternate configurations may be used to implement the described approaches.

Figure 1A:
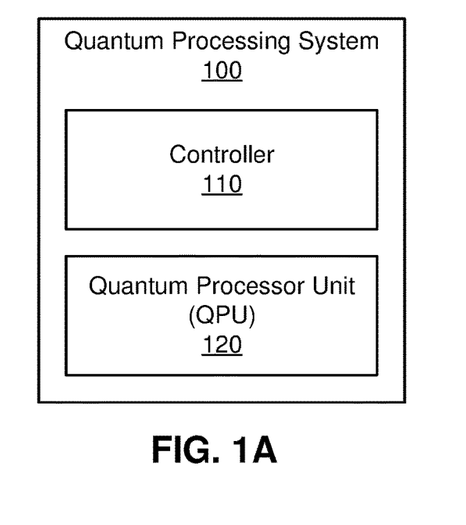
FIG. 1A is a block diagram illustrating a quantum processing system, according to one embodiment.

FIG. 1A illustrates one embodiment of a quantum processing system 100. In the embodiment shown, the quantum processing system 100 includes a (e.g., classical) controller 110 and a quantum processing unit (QPU) 120. As previously described, a QPU is an example of a QIPU (thus, QPU 120 in FIG. 1A may be replaced with a QIPU to illustrate a more general system 100). The controller 110 may be a classical computing system (described further with respect to FIG. 11). While the controller 110 and QPU 120 are illustrated together, they may be physically separate devices (e.g., in a cloud architecture). In some embodiments, the quantum processing system 100 is a multi-modality system that includes both QPUs 120 and quantum sensors. In other embodiments, the quantum processing system 100 includes different or additional elements (e.g., multiple QPUs 120). In addition, the functions may be distributed among the elements in a different manner than described.

Figure 1B:
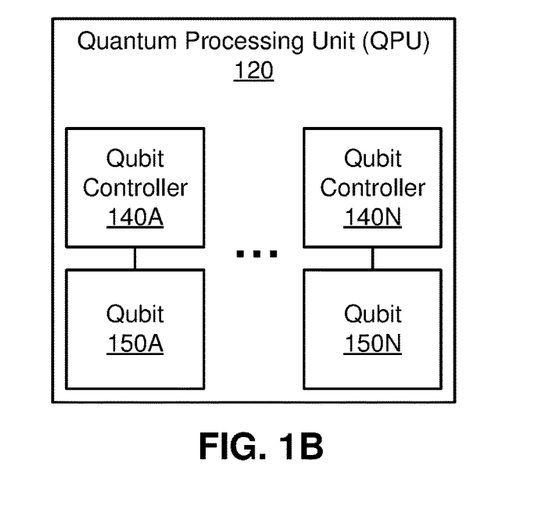
FIG. 1B is a block diagram illustrating a quantum processing unit (QPU), according to one embodiment.

FIG. 1B is a block diagram illustrating a QPU 120, according to one embodiment. The QPU 120 includes any number of quantum bits ("qubits") 150 and associated qubit controllers 140. A qubit 150 is a two-level quantum mechanical system. A qubit 150 can be in a first state, a second state, or a superposition of both states. Example physical implementations of qubits include superconducting qubits, ion traps, and photonics systems (e.g., photons in waveguides). In some embodiments, the QPU 120 includes qudits in addition to or alternative to the qubits 150. A qudit is a multi-level quantum mechanical system (like a qubit) with more than two states. A qubit controller 140 is a module that controls a qubit 150. A qubit controller 140 may include a classical processor such as a CPU, GPU, or FPGA. A qubit controller 140 may perform physical operations on the qubit 150 (e.g., it can perform quantum gate operations on the qubit 140). In the example of FIG. 1B, a separate qubit controller 140 is illustrated for each qubit 150, however a qubit controller 150 may control multiple (e.g., all) qubits 150 of the QPU 120 or multiple controllers 150 may control a single qubit. For example, the qubit controllers 150 can be separate processors, parallel threads on the same processor, or some combination of both. In other embodiments, the QPU 120 includes different or additional elements. In addition, the functions may be distributed among the elements in a different manner than described.

Figure 2:
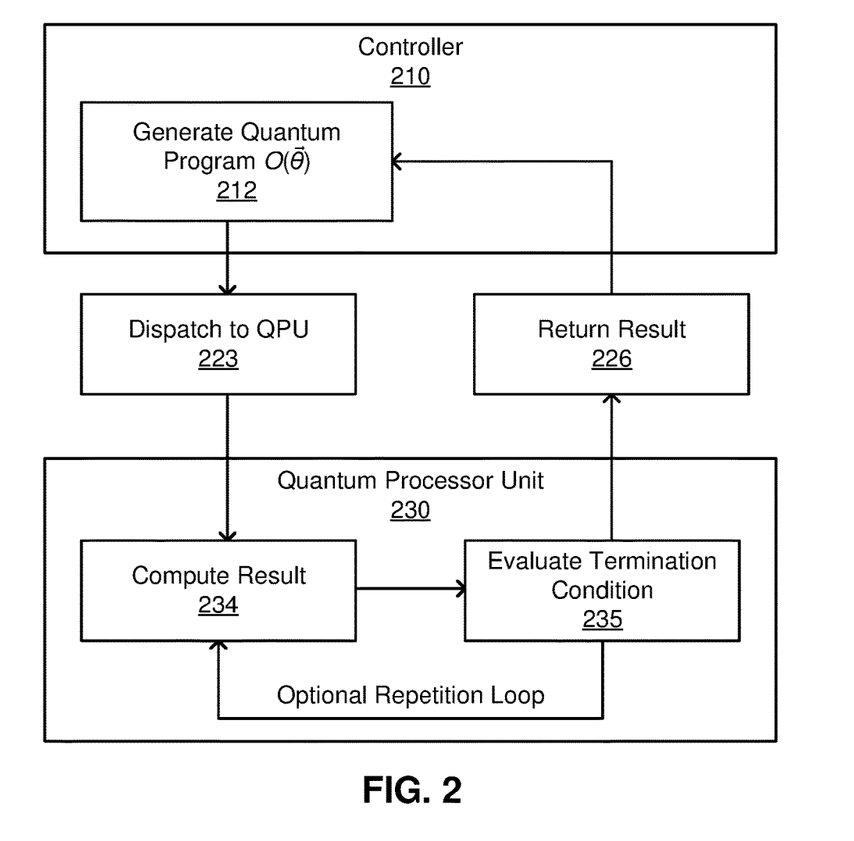
FIG. 2 illustrates an example execution of a hybrid quantum-classical routine on the quantum processing system of FIG. 1A.

FIG. 2 illustrates an example execution of a hybrid quantum-classical routine on the quantum processing system 100. The controller 210 generates 212 a quantum program to be executed or processed by the QPU 230. The quantum program may include instructions or subroutines to be performed by the QPU 230 (or a quantum sensor). In an example, the quantum program is a quantum circuit. In another example, the output or a program measures error syndromes. This program can be represented mathematically in a quantum programming language or intermediate representation such as QASM or Quil. In general, this program can be parameterized by some vector of parameters $\vec{\theta}$. The vector of parameters encodes a set of parameters that affect the result of the quantum program when it is executed by the QPU 230. Example parameters include parameters of quantum gates in a quantum circuit, the order of quantum gates in a quantum circuit, the types of gates in a quantum circuit, or conditions on the control flow graph of the program. In the example of a variational quantum eigensolver, such a parameterized program may be referred to as an ansatz. This generated program is then dispatched 223 to a single QPU 230.

The QPU 230 executes the program to compute 234 the result (e.g., a quantum measurement). The QPU 230 typically runs the program multiple times to accumulate statistics from probabilistic execution. After computing 234 each result, the QPU 230 may evaluate 235 whether a termination condition is met and may trigger the computation of another result if the terminal condition is not met. For example, the program may be executed for some fixed number of repetitions or until some other termination condition is met. After the termination condition is met, the accumulated result (e.g., expectation value) is returned 226 to the controller 210. The controller 210 then (often by evaluating against some objective function) computes new values for $\vec{\theta}$, or an entirely new program, and dispatches 223 the new program to the QPU 230. This hybrid loop between the controller 210 and the QPU 230 can be continued indefinitely (as is the case in quantum error correction) or until some convergence criteria is met (as in the variational quantum eigensolver).

In variational quantum programming, quantum circuits are parameterized as a unitary $U(\vec{\theta})$. Without loss of generality, it can be assumed that these variational programs are initialized in the $|0\rangle$ state and are measured in the computational basis. The expectation value of these variational programs is $\mathbb{E}(\vec{\theta})$. The programmer then also defines an optimizer $\zeta$ such that $$\zeta(\mathbb{E}(\vec{\theta}_{0\ldots L})) = \vec{\theta}_{0\ldots M}$$

maps an expectation value or set of L expectation values to a new set of M parameter settings. As examples, gradient descent and Nelder-Mead have L=M=1. However, if the calculation of the gradient of the quantum circuits is taken into account, using, for example, the parameter-shift rule, then M may be $M=2|\vec{\theta}|+1$. In this case, two quantum circuits may be executed to calculate the gradient for each parameter. Nevertheless, in the most general setting, an optimizer can learn from (e.g., be based on) the whole history of previously observed expectations values and output any number of parameter values to evaluate.

In on embodiment, the $\vec{\theta}_{0\ldots M}$ are turned into a set of M circuits that are run serially. Further, each iteration step t of the optimizer results in a new set of circuits $\vec{\theta}_{0\ldots M}^{t}$. Each iteration step is also run serially resulting in a total of $MN_C$ serial circuit executions if the optimizer takes $N_C$ steps to converge.

Once these new parameters $\vec{\theta}_{0\ldots M}$ are calculated by the optimizer, they may be executed in parallel. For example, they may be executed in parallel on different QPUs 120 and then have their results aggregated back into the optimizer. Depending on the structure of $\zeta$, this parallel execution may happen asynchronously as a form of asynchronous federated optimization. These types of federated learning methods may be used for training classical machine learning models using edge devices like mobile phones. In one embodiment, the QPUs 120 are the edge computing resource. A possible challenge to this approach is that QPUs may be non-uniform. In particular, their noise characteristics may vary and so training variational quantum programs across multiple QPUs can ameliorate the noise reduction possible from variational optimization.

Figure 3:
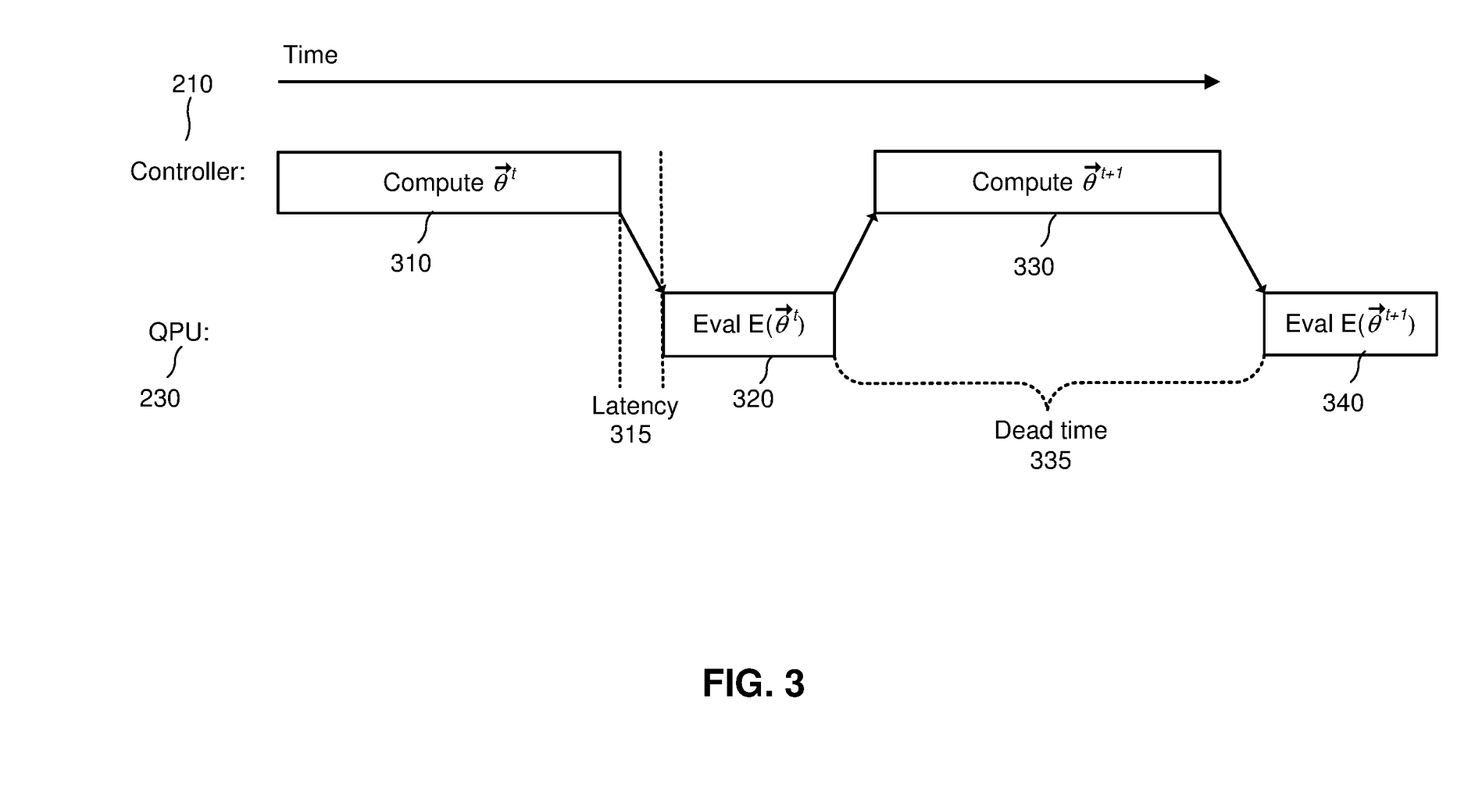
FIG. 3 is a timeline of steps in a serial variational program that includes significant unused QPU dead time.

FIG. 3 illustrates a serial method for executing the steps of a variational program. In the example shown in FIG. 3, one or more controllers 210 or classical processes (also referred to herein as "the CPU" for convenience, without loss of generality) compute 310 parameters $\vec{\theta}^t$ for a quantum program and the QPU 230 evaluates 320 the expectation value of the quantum program $\mathbb{E}(\vec{\theta}^t)$. There is a latency 315 between the computation 310 and evaluation 320 as data is passed between the controller 210 and QPU 230. Once evaluation 320 is complete, the controller 210 computes 330 the next variational step $\vec{\theta}^{t+1}$ and the QPU 230 evaluates 340 $\mathbb{E}(\vec{\theta}^{t+1})$. Thus, there is a dead time 335 when the QPU 230 is idling while the next variational step $\vec{\theta}^{t+1}$ is being computed 330. The latency 315 and dead time 335 in may be disadvantageous since they result in inefficient use of the QPU 230.

In various embodiments, the quantum processing system 100 uses the "dead time" (e.g., dead time 335) incurred between variational optimizers steps to mimic running variational quantum programs in parallel. This may speed up execution time since it uses the same QPU 230 repeatedly across different time bins. In the following paragraphs, an embodiment in which M=1 is described for illustrative purposes (referred to as the asynchronous approach). However, the described asynchronous approach may be generalized to larger values of M. In fact, the efficiency gains yielded by this approach may be more significant for larger values of M.

Figure 4:
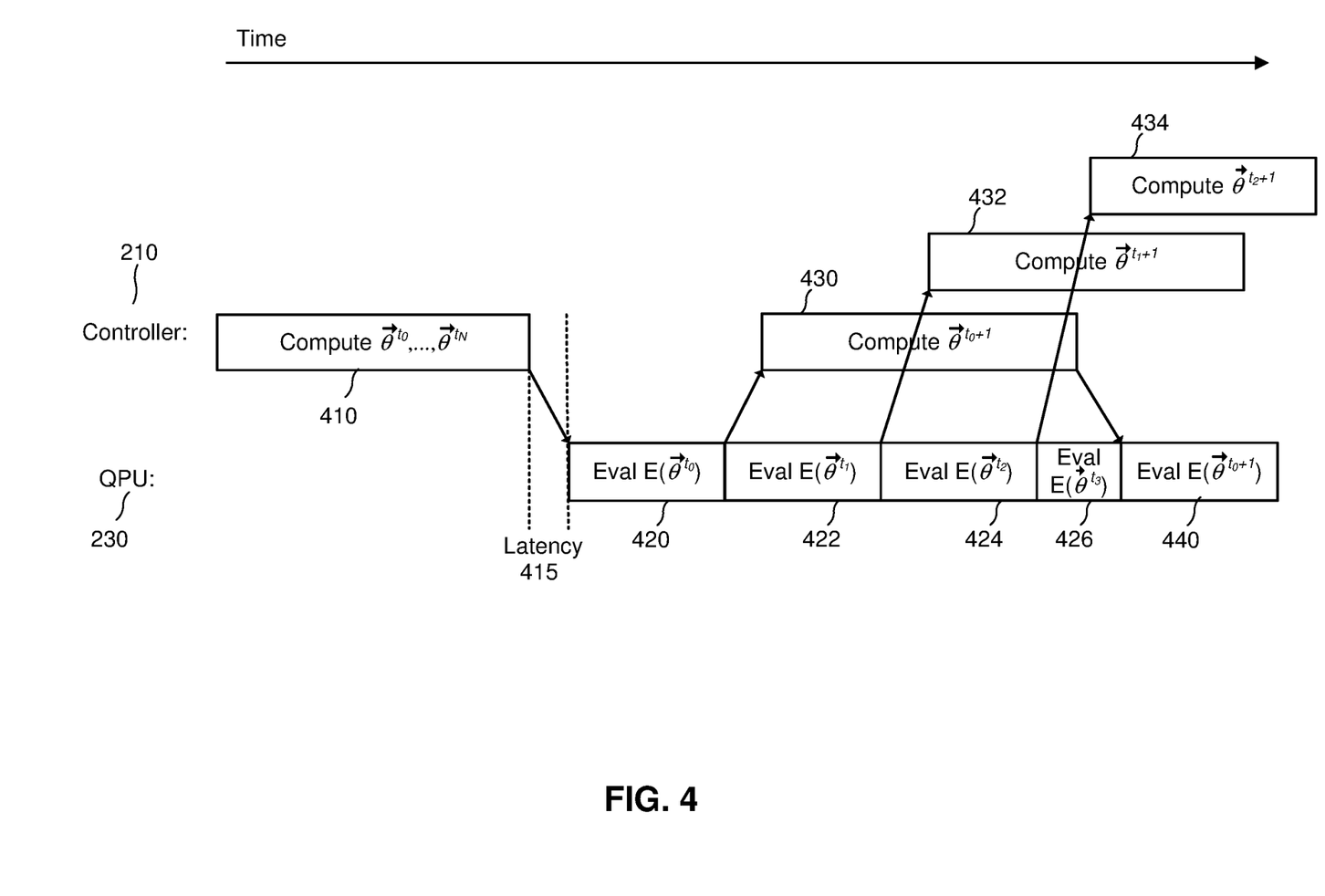
FIG. 4 is a timeline of steps in a serial variational program that includes efficient use of the QPU, according to one embodiment.

FIG. 4 illustrates the asynchronous approach in which some or all of the dead time 335 is used as if it were another QPU 230 available for execution, according to one embodiment. Thus, more efficient use of the QPU 230 may be realized. In the embodiment shown, there is an asynchronous interaction between the controller 210 and the QPU 230. The controller 210 calculates 410 a series of initial parameter sets $\vec{\theta}^{t_0}, \ldots, \vec{\theta}^{t_N}$ and dispatches them into a queue that the QPU 230 pulls from. When the QPU 230 evaluates expectation values, it broadcasts them to the controller 210. For example, in FIG. 4, the QPU 230 evaluates 420 a first expectation value $\mathbb{E}(\vec{\theta}^{t_0})$ and broadcasts it to the controller 210 and, while the controller 210 is computing 430 the next variational step, $\vec{\theta}^{t_0+1}$, the QPU 230 is evaluating 422 a second expectation value $\mathbb{E}(\vec{\theta}^{t_1})$, evaluating 424 a third expectation value $\mathbb{E}(\vec{\theta}^{t_2})$, etc. Similarly, the controller 210 may calculate 432, 434 variants of the next variational step based on the different expectation values (e.g., using multiple classical processors 210 operating in parallel or threads operating in parallel). The controller 210 can both append to the queue for the QPU 230 and interrupt its execution (e.g., at any point in the queue). In FIG. 4, this is shown by the shortened evaluation 426 of $\mathbb{E}(\vec{\theta}^{t_3})$. In practice, this can mean that less samples are taken at a particular $\vec{\theta}^{t_i}$ since the processes may have determined that more information would be learned by evaluating 440 $\mathbb{E}(\vec{\theta}^{t_j+1})$ instead (where i≠j).

Treating the controllers 210 as Bayesian learners may give insight for how to manage them. The controllers 210 begin with some prior over $\vec{\theta}$ and then choose to evaluate at new parameters based on where the most useful information will be gained. By switching to this asynchronous method of execution the Bayesian learner can keep evaluating new data on the QPU 230 even while computing what the next best set of parameters to try is. This new data is extra information for informing the following step.

As an example to illustrate how much time may be saved using this asynchronous approach, assume that the shot rate for the QPU 210 is 1 Mhz (a shot may refer to a single execution of the QPU 120), the time for (e.g. classical) optimization (e.g., step 430) plus latency (e.g., latency 415) is 0.1 seconds for each step, and the number of shots for each expectation value is $N_s=10^4$. These are plausible values for current state of the art systems. This translates to a dead time of 0.1 seconds in which an additional $10^5$ samples may be evaluated using the asynchronous approach. This is ten times more samples than may be taken in each step of the serial execution method. By this logic, the asynchronous method gives up to ten times as many samples as would be obtained by the serial method. More generally, the asynchronous approach can provide a factor of $\tau_C * r/N_s$ more samples, where $\tau_C$ is the duration of a (e.g., classical) computation step including bi-directional latency and r is the shot rate of the QPU 230.

In comparison to the serial approach of FIG. 3, the asynchronous approach shown in FIG. 4 may use multiple controllers 210 to enable a single QPU 230 to be run more frequently (e.g., continuously) with little or no dead time. During this asynchronous method, the QPU 230 may (e.g., continuously) stream data (or periodically send batches of data) back for processing, thus accomplishing more computations in less time. An increase in the amount of data computed does not in general decrease the runtime linearly, though it may decrease it sublinearly. This extra data can be used to improve the optimizer and result in better/faster convergence of a variational algorithm.

Figure 5:
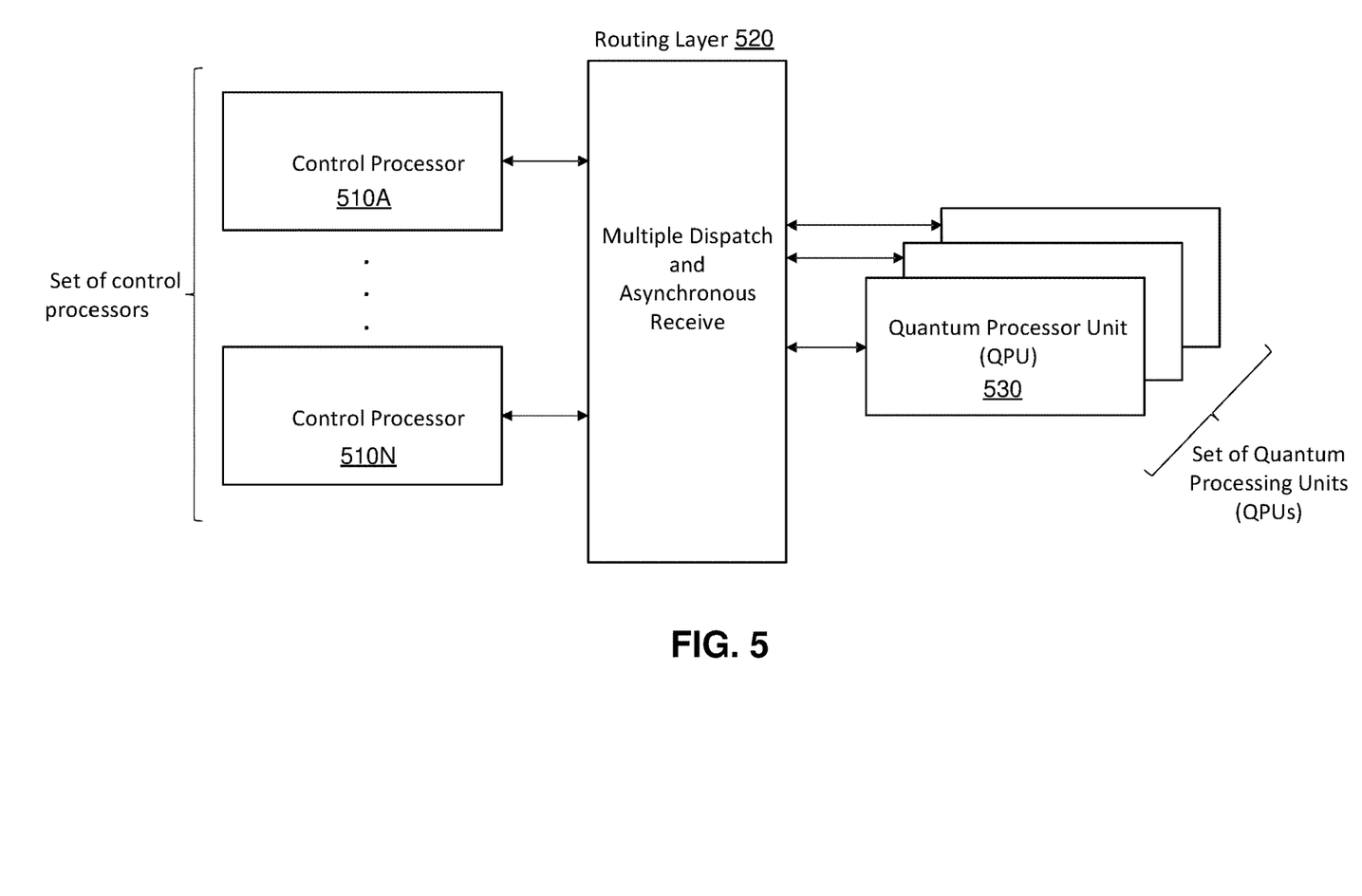
FIG. 5 is a block diagram illustrating the use of multiple control processors that dispatch quantum programs (e.g., simultaneously) in parallel to a set of QPUs, according to one embodiment.

FIG. 5 illustrates an embodiment in which multiple controllers 510 dispatch quantum programs in parallel (e.g., simultaneously). An intermediate routing layer 520 routes these programs to one or more QPUs 530. The QPUs 530 execute their computation and return their results (e.g., asynchronously) to the routing layer 520. The routing layer 520 aggregates and returns these results to the set of controllers 510. The controllers 510 then in turn can generate additional programs for execution (e.g., asynchronously).

Figure 6:
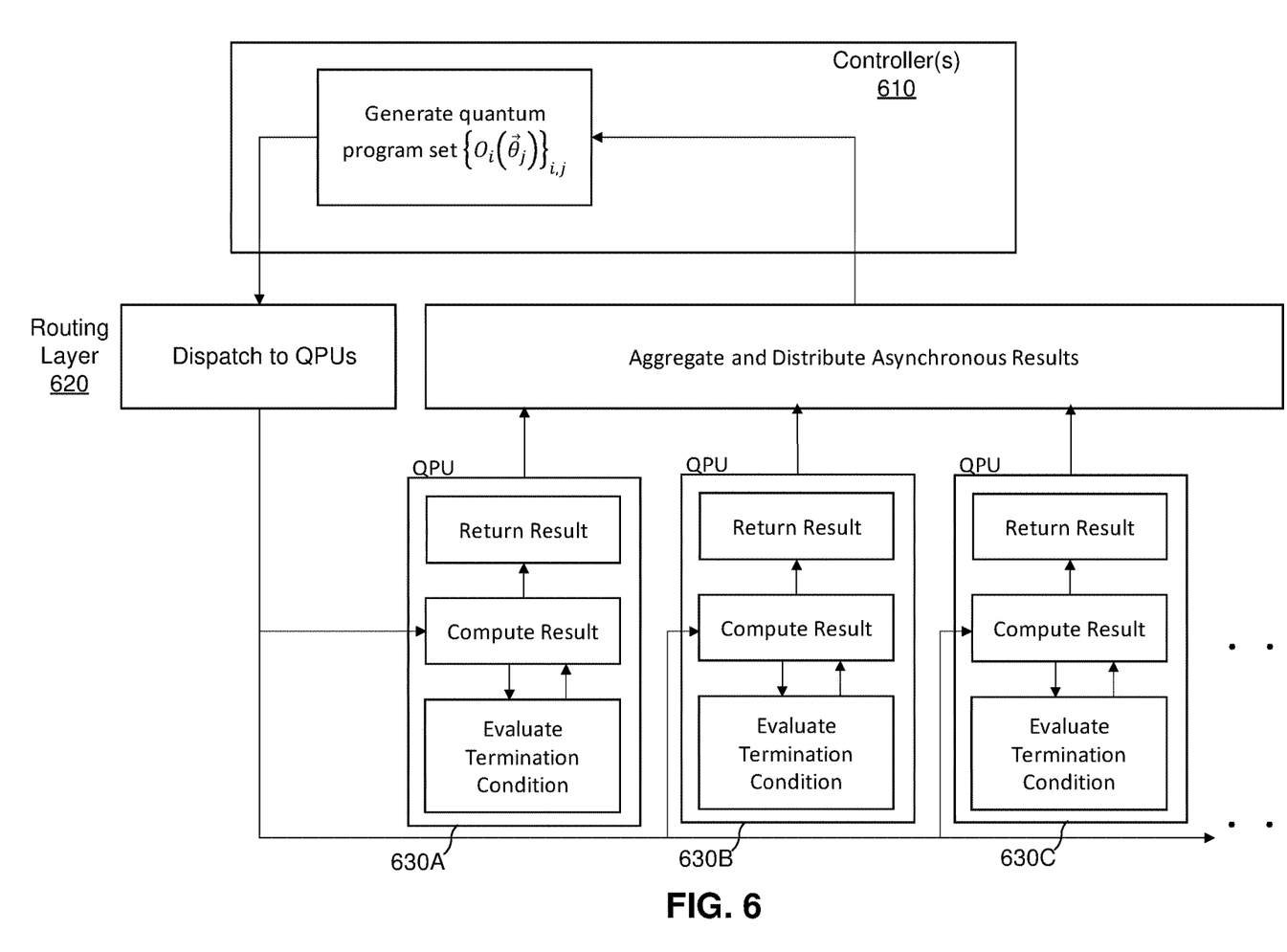
FIG. 6 illustrates asynchronous operation of the set of QPUs shown in FIG. 5, according to one embodiment.

FIG. 6 contrasts this asynchronous approach with the serial method illustrated in FIG. 2. In the asynchronous approach, results from the QPUs 630 are returned (e.g., immediately, subject to latencies and other inherent delays) to the routing layer 620 without waiting for the termination conditions to be met on each QPU 630. This allows the controllers 610 to receive extra data in a stream (or in batches) from the QPUs 630. This extra data can be, for example, used to update a learning system to cause a variational quantum eigensolver to converge faster. In this example, the controllers 610 can use federated learning algorithms where the edge compute units are the QPUs 630.

Figure 7:
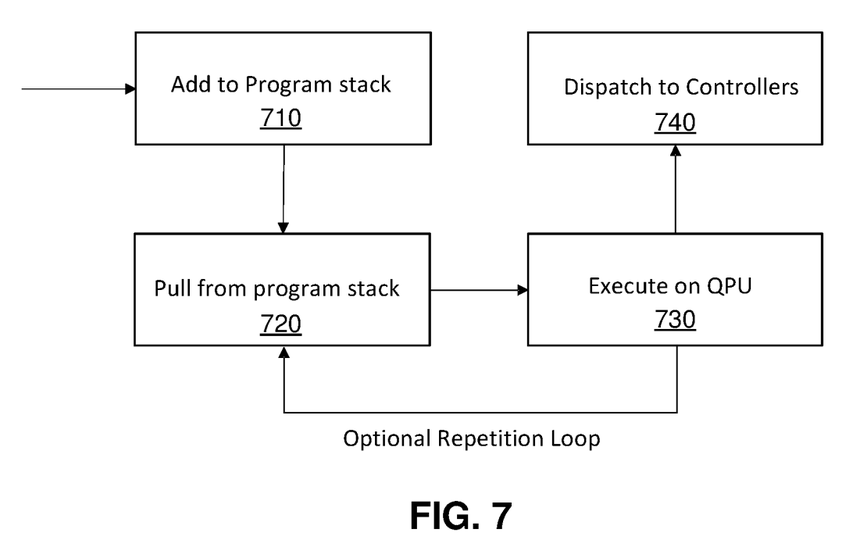
FIG. 7 illustrates an example implementation of the asynchronous QPU operation shown in FIG. 6, according to one embodiment.

The asynchronous method can be implemented as illustrated in FIG. 7, where generated programs are added 710 to a program stack (also referred to as a queue) from the routing layer 620. The programs are pulled 720 from the stack for execution by QPUs 630. For each execution, a QPU 630 (or instructions from the program) can decide (e.g., via a termination condition) to re-run the same computation to gather more statistics or to move onto another program. The stack may have priority ordering of the programs. In some embodiments, the routing layer 620 (or the controller(s) 610) may interrupt the execution of a program on a QPU 630 when a new program is submitted to that QPU 630. When a QPU 630 has completed execution of a program, it dispatches 740 the results to the controller 610, for example, without waiting for other QPUs 630 to complete execution of their programs. In some embodiments, a program in the stack specifies a specific QPU 630 that should execute it. Since each QPU 630 may have its own noise profile, it may be advantageous for the same QPU 630 (or a set of QPUs 630 with substantially identical noise profiles) to execute a program with different parameters. Determining whether a noise profile is substantially identical can very depending on the model of noise and an operator may choose how to define substantially identical noise models. Some noise models have many parameters. For example, different error rates for different qubits. This may be rolled up into some criterion or criteria such as a threshold on the average. In other cases, it may be more complex. In some embodiments, one can cluster similar QPUs based on the diamond norm distance of their quantum process operators. If measuring quantum process operators is difficult, heuristic proxies may be used.

As described above with reference to FIG. 4, a single QPU 630 may be used as if it were multiple QPUs by using what would otherwise be dead time between variational steps to perform other calculations. Thus, the configuration shown in FIG. 6 may be approximated using multiple controllers 610 and a single QPU 630. Alternatively, multiple QPUs 630 may be used, each using the technique of FIG. 4 to increase the effective number of QPUs available.

Figure 8:
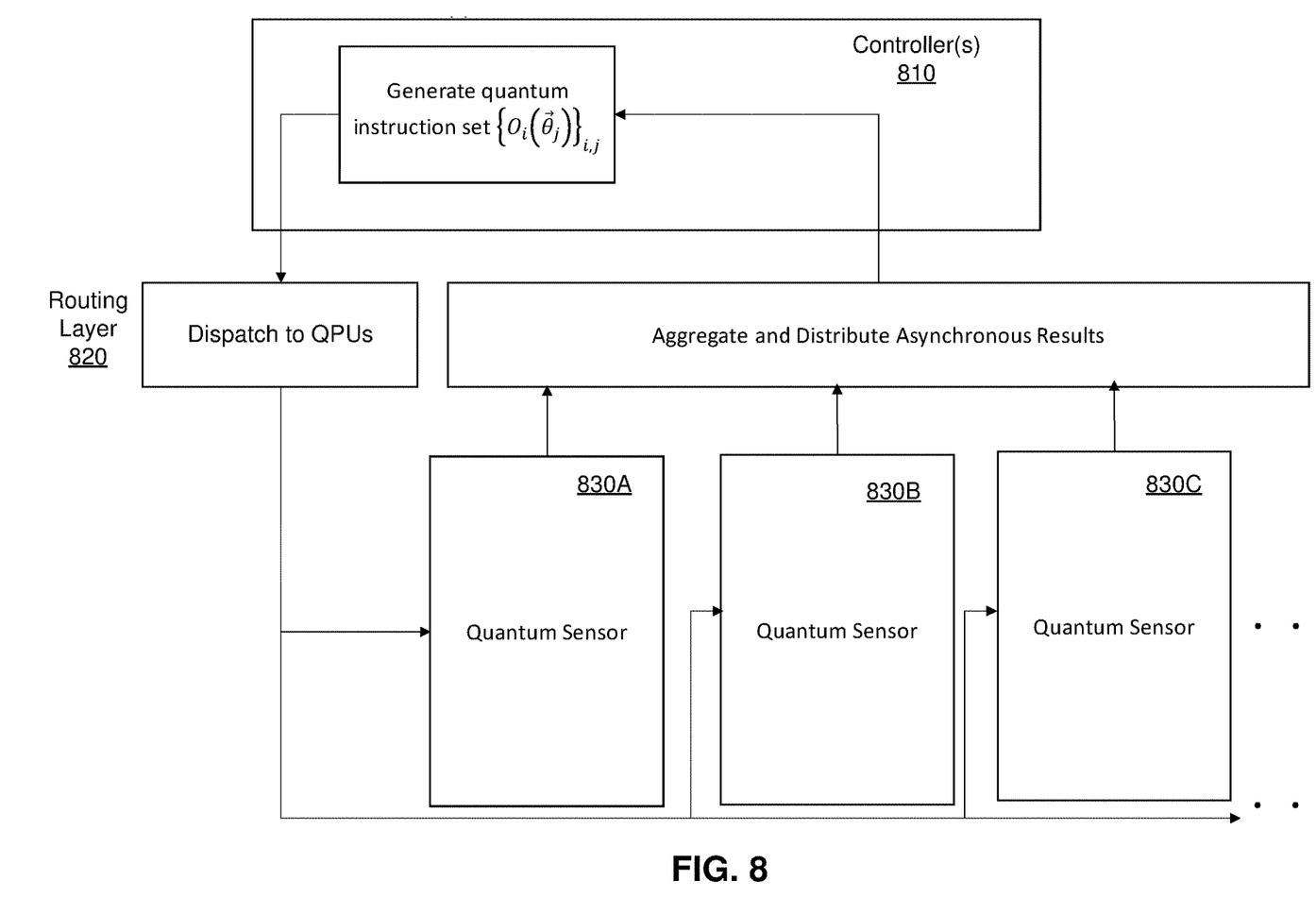
FIG. 8 illustrates the application of the asynchronous approach of FIGS. 5-7 to a set of quantum sensors, according to one embodiment.

FIG. 8 illustrates that the asynchronous approach can be applied to sets of quantum sensors 830. Here, one or more quantum programs (e.g., instructions) are sent from one or more controllers 810 to a bank of quantum sensors 830, via a routing layer 820. The quantum programs may include tuning parameters for a sensor 830. The quantum sensors 830 (e.g., asynchronously) generate data and return it in a streaming or batched manner to the controllers 810 for further processing.

The same asynchronous approach can also be applied in other contexts. For example, the disclosed asynchronous approach can be applied to nodes in a quantum network or other distributed systems of quantum sensing, networking, and computation. In fact, the controllers themselves do not necessarily have to be classical. The controllers may be QIPUs (e.g., QPUs 120). For example, a controller may be a partitioned set of compute unites (e.g., qubits) of a QIPU. Additionally or alternatively, the controllers may be threads on a single QIPU. Furthermore, the computation performed by the QIPUs may relate to the execution of a network protocol. For example, QIPUs may be nodes of a quantum network and the QIPUs execute a network protocol.

Figure 9:
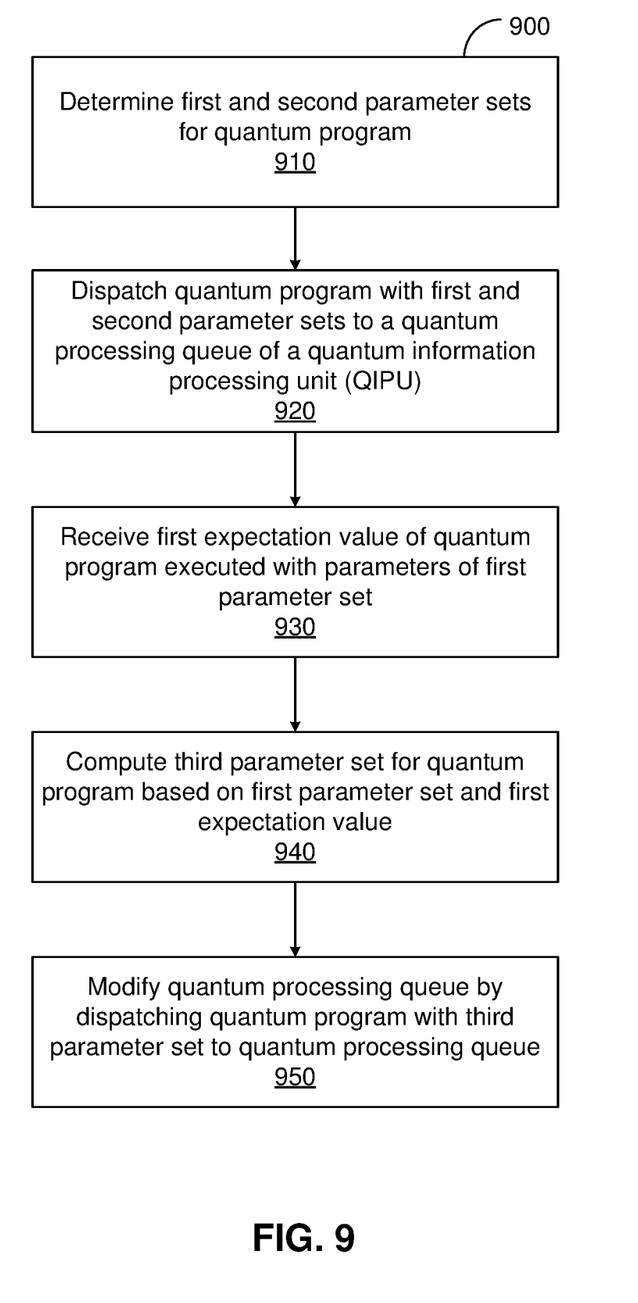
FIG. 9 is a flow chart illustrating an asynchronous method for quantum information processing, according to one embodiment.

FIG. 9 is a flow chart illustrating an asynchronous method 900, according to one embodiment. The steps of method 900 may be performed by one or more controllers. The steps of method 900 may be performed in different orders, and the method may include different, additional, or fewer steps. Aspects of method 1000 (described with respect to FIG. 10) may also be applicable to method 900.

A controller determines 910 first and second parameter sets for a quantum program. In some embodiments, the second parameter set is for a different quantum program. In some embodiments, the quantum program is a quantum circuit of a variational optimization problem and the third parameter set corresponds to a next variational step.

The controller dispatches 920 the quantum program with the first and second parameter sets to a quantum processing queue of a quantum information processing unit (QIPU). The quantum processing queue is configured to store quantum programs for execution by the QIPU.

The controller receives 930 a first expectation value of the quantum program executed by the QIPU with parameters of the first parameter set. The controller may also receive individual results of execution of the quantum program with the parameters of the first set (e.g., in a streaming or batched fashion).

While the QIPU evaluates a second expectation value of the quantum program with parameters of the second parameter set, the controller computes 940 a third parameter set for the quantum program based on the first parameter set and the first expectation value.

The controller modifies 950 the quantum processing queue by dispatching the quantum program with the third parameter set to the quantum processing queue. Modifying the quantum processing queue may comprise adding the third parameter set to an end of the quantum processing queue. Additionally or alternatively, modifying the queue may comprise instructing the QIPU to cease a current execution and to evaluate an expectation value of the quantum program with parameters of the third parameter set.

In some embodiments, the controller receives the second expectation value of the quantum program executed by the QIPU with parameters of the second parameter set. While the QIPU evaluates a third expectation value of the quantum program with parameters of the third parameter set, the controller computes a fourth parameter set for the quantum program based on the first and second parameter sets and the first and second expectation values. The controller modifies the quantum processing queue by dispatching the quantum program with the fourth parameter set to the quantum processing queue.

In some embodiments, while the QIPU evaluates the first expectation value of the quantum program with parameters of the first parameter set or a third expectation value of the quantum program with parameters of the third parameter set, the controller computes a parameter set for a second quantum program. The controller modifies the quantum processing queue by dispatching the second quantum program with the parameter set of the second quantum program to the quantum processing queue.

In some embodiments, the QIPU is one of a set of QIPUs and the quantum processing queue is configured to store quantum programs each for execution by one or more QIPUs of the set. Expectation values calculated by the QIPUs may be received by the controller asynchronously. In some embodiments, dispatching the quantum program with the third parameter set further includes the controller dispatching an instruction for the quantum program with the third parameter set to be executed by the QIPU. In some embodiments, dispatching the quantum program with the third parameter set further includes the controller dispatching an instruction for the quantum program with the third parameter set to be executed by a QIPU with a noise profile that is substantially the same as a noise profile of the QIPU.

In some embodiments, responsive to the quantum processing queue having less than a threshold number of programs, the controller re-dispatches the quantum program with the first parameter set (or any other parameter set) to the quantum processing queue. This may provide additional statistical samples of and may ensure that the queue does not become empty.

Figure 10:
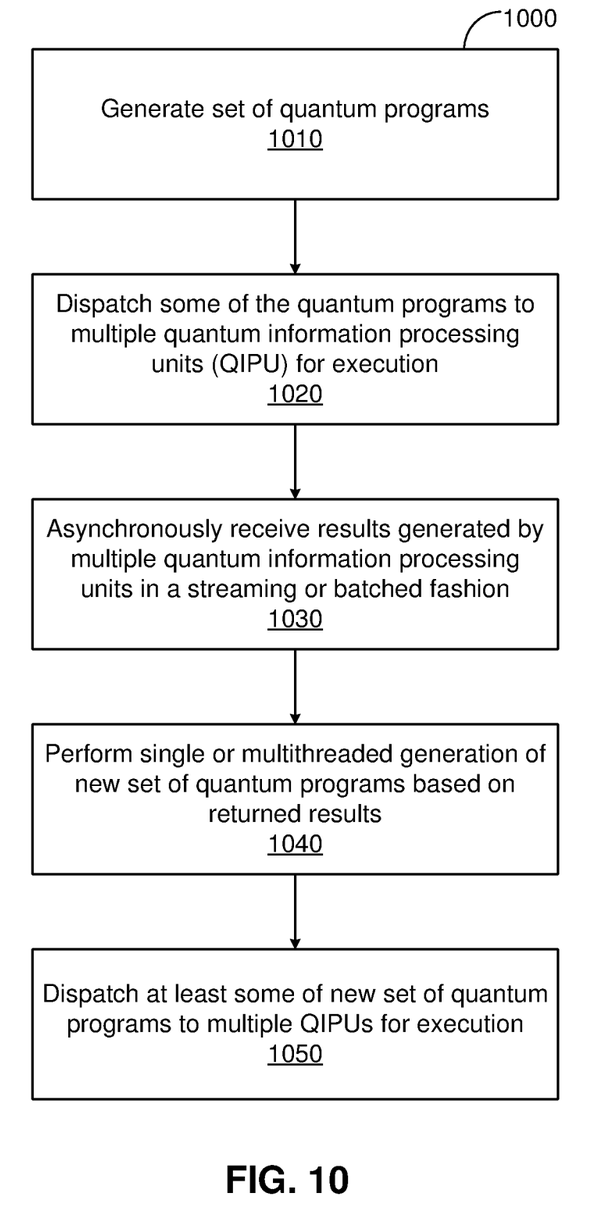
FIG. 10 is a flow chart illustrating another asynchronous method for quantum information processing, according to one embodiment.

FIG. 10 is a flow chart illustrating another asynchronous method 1000, according to one embodiment. The steps of method 1000 may be performed by one or more controllers. The steps of method 1000 may be performed in different orders, and the method 1000 may include different, additional, or fewer steps. Aspects of method 900 (described above with respect to FIG. 9) may also be applicable to method 1000.

A controller generates 1010 a set of quantum programs.

The controller dispatches 1020 at least some of the set of quantum programs to multiple quantum information processing units (QIPUs) for execution.

The controller asynchronously receives 1030 results generated by the multiple QIPUs in a streaming or batched fashion. The results may be generated by the multiple QIPUs processing the dispatched quantum programs. The results may be expectation values or individual results from processing quantum programs.

The controller performs 1040 single or multithreaded generation of a new set of quantum programs based on the returned results.

The controller dispatches 1050 at least some of the new set of quantum programs to the multiple QIPUs for execution. In some embodiments, a QIPU ceases processing a quantum program in the set prior to completion responsive to receiving a quantum program from the new set.

In some embodiments, the set of quantum programs are generated by optimizing an objective function in a variational quantum algorithm by incorporating streaming results into a Bayesian learning model.

Figure 11:
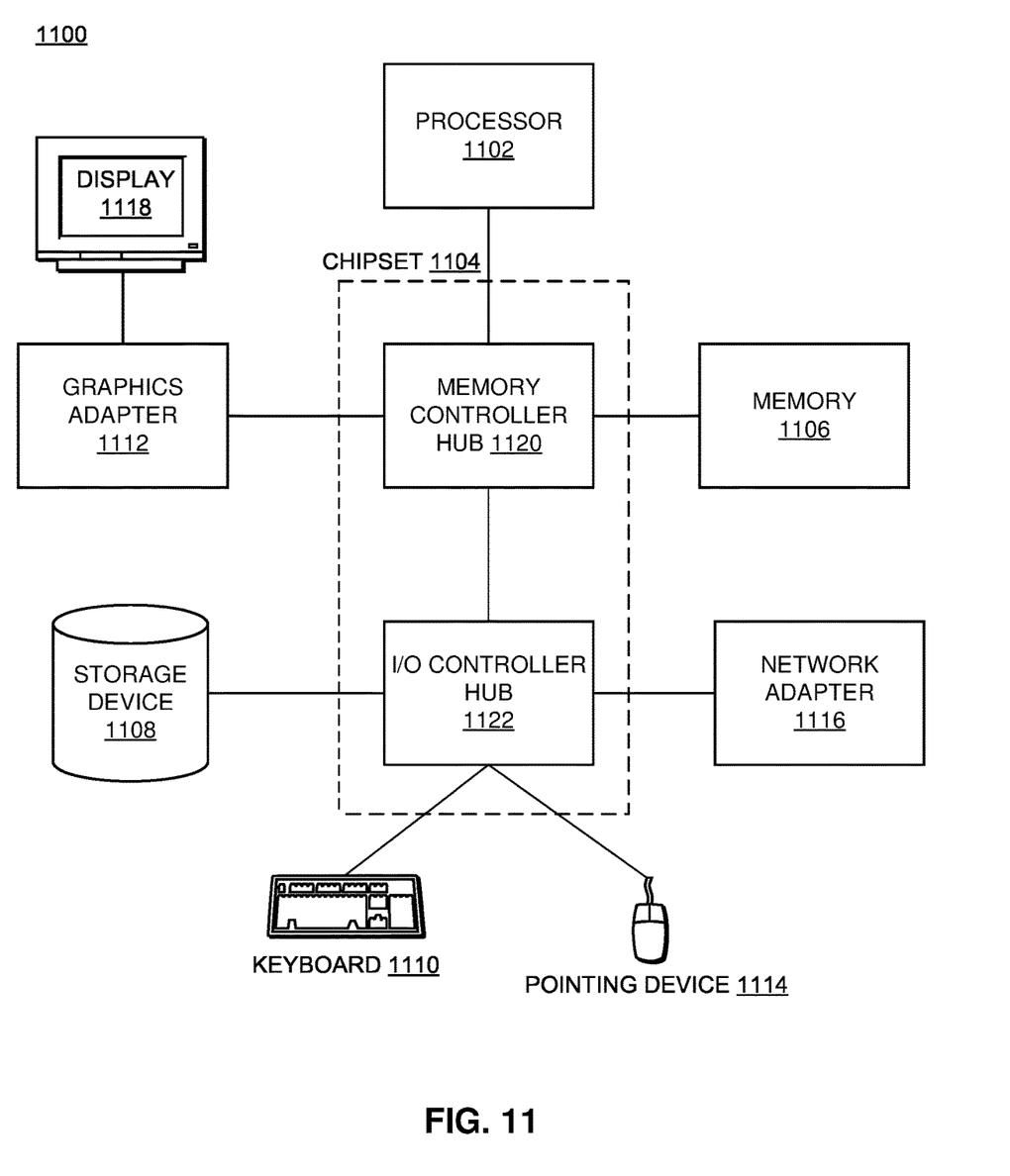
FIG. 11 is an example architecture of a classical computing system suitable for use as a controller, according to one embodiment.

FIG. 11 is an example architecture of a computing system, according to an embodiment. Although FIG. 11 depicts a high-level block diagram illustrating physical components of a computer used as part or all of one or more entities described herein, in accordance with an embodiment, a computer may have additional, less, or variations of the components provided in FIG. 11. Although FIG. 11 depicts a computer 1100, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 11 are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O hub 1122. In another embodiment, the memory 1106 is coupled directly to the processor 1102 instead of the chipset 1104. In some embodiments, the computer 1100 includes one or more communication buses for interconnecting these components. The one or more communication buses optionally include circuitry (sometimes called a chipset) that interconnects and controls communications between system components.

The storage device 1108 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 1108 can also be referred to as persistent memory. The pointing device 1114 may be a mouse, track ball, or other type of pointing device, and is used in combination with the keyboard 1110 to input data into the computer 1100. The graphics adapter 1112 displays images and other information on the display 1118. The network adapter 1116 couples the computer 1100 to a local or wide area network.

The memory 1106 holds instructions and data used by the processor 1102. The memory 1106 can be non-persistent memory, examples of which include high-speed random access memory, such as DRAM, SRAM, DDR RAM, ROM, EEPROM, flash memory.

As is known in the art, a computer 1100 can have different or other components than those shown in FIG. 11. In addition, the computer 1100 can lack certain illustrated components. In one embodiment, a computer 1100 acting as a server may lack a keyboard 1110, pointing device 1114, graphics adapter 1112, or display 1118. Moreover, the storage device 1108 can be local or remote from the computer 1100 (such as embodied within a storage area network (SAN)).

As is known in the art, the computer 1100 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 1108, loaded into the memory 1106, and executed by the processor 302.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for asynchronous quantum information processing. Thus, while particular embodiments and applications have been illustrated and described, it is to be understood that the described subject matter is not limited to the precise construction and components disclosed. The scope of protection should be limited only by the following claims.

What is claimed is:

1. A quantum processing system comprising:
   one or more controllers configured to:
   calculate a series of initial parameter value sets for a quantum program;
   dispatch the quantum program with the series of initial parameter value sets to a quantum processing queue;
   receive a first expectation value corresponding to the quantum program with parameter values of a first initial parameter value set of the series of initial parameter value sets;
   compute a next parameter value set based on the first initial parameter value set and the first expectation value; and
   dispatch the next parameter value set to the quantum processing queue; and
   a quantum information processing unit (QIPU) comprising quantum bits (qubits), the QIPU configured to:
   pull the first initial parameter value set from the quantum processing queue;
   perform first quantum operations on the qubits according to the quantum program with parameter values of the first initial parameter value set to generate a first quantum state;
   measure the first quantum state of the qubits;
   evaluate the first expectation value for the quantum program with parameter values of the first initial parameter value set based on the measurement of the first quantum state;
   broadcast the first expectation value to the one or more controllers;
   while the next parameter value set is being computed by the one or more controllers based on the first initial parameter value set and the first expectation value, perform second quantum operations on the qubits according to the quantum program with parameter values of a second initial parameter value set of the series of initial parameter value sets, wherein the second quantum operations performed on the qubits generates a second quantum state;
   pull the next parameter value set computed by the one or more controllers from the quantum processing queue;
   perform third quantum operations on the qubits according to the quantum program with parameter values of the next parameter value set to generate a third quantum state;
   measure the third quantum state of the qubits; and
   evaluate a next expectation value for the quantum program with parameter values of the next parameter value set based on the measurement of the third quantum state.

2. The quantum processing system of claim 1, wherein the QIPU is further configured to cease performing the second quantum operations on the qubits according to the quantum program with parameter values of the second initial parameter value set prior to completion responsive to receiving the next parameter value set.

3. The quantum processing system of claim 1, wherein the QIPU is one of a set of QIPUs and the quantum processing queue is configured to store quantum programs for execution by QIPUs of the set of QIPUs.

4. The quantum processing system of claim 3, wherein dispatching the next parameter value set further includes dispatching an instruction for the quantum program with the next parameter value set to be executed by the QIPU.

5. The quantum processing system of claim 3, wherein dispatching the next parameter value set includes dispatching an instruction for the quantum program with the next parameter value set to be executed by a second QIPU with a noise profile that is substantially identical to a noise profile of the QIPU.

6. The quantum processing system of claim 1, wherein the one or more controllers are further configured to, responsive to the quantum processing queue having less than a threshold number of programs, re-dispatch the quantum program with the series of initial parameter value sets to the quantum processing queue.

7. A non-transitory computer-readable storage medium comprising stored instructions that, when executed by a quantum processing system including one or more controllers and a quantum information processing unit (QIPU) comprising quantum bits (qubits), cause the quantum processing system to perform operations including:
   calculating, by the one or more controllers, a series of initial parameter value sets for a quantum program;
   dispatching, by the one or more controllers, the quantum program with the series of initial parameter value sets to a quantum processing queue;
   pulling, by the QIPU, a first parameter value set of the series of initial parameter value sets from the quantum processing queue;
   performing, by the QIPU, first quantum operations on the qubits according to the quantum program with parameter values of the first initial parameter value set to generate a first quantum state;
   measuring, by the QIPU, the first quantum state of the qubits;
   evaluating a first expectation value for the quantum program with parameter values of a first initial parameter value set of the series of initial parameter value sets, the first expectation value evaluated based on the measurement of the first quantum state;
   computing, by the one or more controllers, a next parameter value set based on the first initial parameter value set and the first expectation value;
   while the next parameter value set is being computed by the one or more controllers based on the first initial parameter value set and the first expectation value, performing second quantum operations on the qubits according to the quantum program with parameter values of a second initial parameter value set of the series of initial parameter value sets, wherein the second quantum operations performed on the qubits generate a second quantum state;
   dispatching, by the one or more controllers, the next parameter value set to the quantum processing queue;
   pulling, by the QIPU, the next parameter value set computed by the one or more controllers from the quantum processing queue;
   performing third quantum operations on the qubits according to the quantum program with parameter values of the next parameter value set to generate a third quantum state;
   measuring the third quantum state of the qubits; and evaluating a next expectation value for the quantum program with parameter values of the next parameter value set based on the measurement of the third quantum state.

8. The non-transitory computer-readable storage medium of claim 7, further comprising: ceasing, by the QIPU, performing the second quantum operations on the qubits according to the quantum program with parameter values of the second initial parameter value set prior to completion responsive to receiving the next parameter value set.

9. The non-transitory computer-readable storage medium of claim 7, wherein the QIPU is one of a set of QIPUs and the quantum processing queue is configured to store quantum programs for execution by QIPUs of the set of QIPUs.

10. The non-transitory computer-readable storage medium of claim 9, wherein dispatching the next parameter value set further includes dispatching an instruction for the quantum program with the next parameter value set to be executed by the QIPU.

11. The non-transitory computer-readable storage medium of claim 9, wherein dispatching the next parameter value set includes dispatching an instruction for the quantum program with the next parameter value set to be executed by a second QIPU with a noise profile that is substantially identical to a noise profile of the QIPU.

12. The non-transitory computer-readable storage medium of claim 7, further comprising: responsive to the quantum processing queue having less than a threshold number of programs, re-dispatching the quantum program with the series of initial parameter value sets to the quantum processing queue.

13. A method comprising:
calculating, by one or more controllers, a series of initial parameter value sets for a quantum program;
dispatching, by the one or more controllers, the quantum program with the series of initial parameter value sets to a quantum processing queue;
pulling, by a quantum information processing unit (QIPU) comprising quantum bits (qubits), a first parameter value set of the series of initial parameter value sets from the quantum processing queue;
performing, by the QIPU, first quantum operations on the qubits according to the quantum program with parameter values of the first initial parameter value set to generate a first quantum state;
measuring, by the QIPU, the first quantum state of the qubits;
evaluating a first expectation value for the quantum program with parameter values of a first initial parameter value set of the series of initial parameter value sets, the first expectation value evaluated based on the measurement of the first quantum state;
computing, by the one or more controllers, a next parameter value set based on the first initial parameter value set and the first expectation value;
while the next parameter value set is being computed by the one or more controllers based on the first initial parameter value set and the first expectation value, performing second quantum operations on the qubits according to the quantum program with parameter values of a second initial parameter value set of the series of initial parameter value sets, wherein the second quantum operations performed on the qubits generate a second quantum state;
dispatching, by the one or more controllers, the next parameter value set to the quantum processing queue;
pulling, by the QIPU, the next parameter value set computed by the one or more controllers from the quantum processing queue;
performing third quantum operations on the qubits according to the quantum program with parameter values of the next parameter value set to generate a third quantum state;
measuring the third quantum state of the qubits; and
evaluating a next expectation value for the quantum program with parameter values of the next parameter value set based on the measurement of the third quantum state.

14. The method of claim 13, further comprising: ceasing, by the QIPU, performing the second quantum operations on the qubits according to the quantum program with parameter values of the second initial parameter value set prior to completion responsive to receiving the next parameter value set.

15. The method of claim 13, wherein the QIPU is one of a set of QIPUs and the quantum processing queue is configured to store quantum programs for execution by QIPUs of the set of QIPUs.

16. The method of claim 15, wherein dispatching the next parameter value set further includes dispatching an instruction for the quantum program with the next parameter value set to be executed by the QIPU.

17. The method of claim 15, wherein dispatching the next parameter value set includes dispatching an instruction for the quantum program with the next parameter value set to be executed by a second QIPU with a noise profile that is substantially identical to a noise profile of the QIPU.

18. The method of claim 13, further comprising: responsive to the quantum processing queue having less than a threshold number of programs, re-dispatching the quantum program with the series of initial parameter value sets to the quantum processing queue.

* * * * *

UNITED STATES PATENT AND TRADEMARK OFFICE
CERTIFICATE OF CORRECTION

PATENT NO. : 12,141,602 B2
APPLICATION NO. : 17/234700
DATED : November 12, 2024
INVENTOR(S) : William Joseph Zeng Page 1 of 1

It is certified that error appears in the above-identified patent and that said Letters Patent is hereby corrected as shown below:

In the Claims

In Column 12, in Claim 7, Line 66, delete "state:" and insert -- state; --, therefor.

Signed and Sealed this
Eleventh Day of February, 2025

Coke Morgan Stewart
*Acting Director of the United States Patent and Trademark Office*